United States Patent [19]

Gunter, Jr. et al.

[11] Patent Number: 4,697,922

[45] Date of Patent: Oct. 6, 1987

[54] DUAL MODE LASER VELOCIMETER

[75] Inventors: William D. Gunter, Jr., San Jose; Ralph W. Donaldson; Alma G. Anderson, Jr., both of Sunnyvale, all of Calif.

[73] Assignee: The United States of America as represented by the Administrator of the National Aeronautics and Space Administration, Washington, D.C.

[21] Appl. No.: 846,427

[22] Filed: Mar. 31, 1986

[51] Int. Cl.⁴ .......................... G01P 3/36; G02B 27/00
[52] U.S. Cl. .................................. 356/28.5; 350/163; 350/174; 350/572; 350/573
[58] Field of Search ............... 350/163, 174, 572, 573; 219/121 LP, 121 LR, 121 LS, 121 LT; 356/28.5

[56] References Cited

U.S. PATENT DOCUMENTS

| | | | |
|---|---|---|---|
| 3,588,439 | 6/1971 | Heller et al. | 219/121 LR |
| 3,825,346 | 7/1974 | Rizzo | 356/28.5 |
| 3,895,872 | 7/1975 | Dandliker et al. | 356/28.5 |
| 4,148,585 | 4/1979 | Bargeron et al. | 356/28.5 |
| 4,263,002 | 4/1981 | Sathyakumar | 356/28.5 |
| 4,346,990 | 8/1982 | Rhodes | 356/28.5 |
| 4,470,696 | 9/1984 | Ballard | 356/28.5 |
| 4,506,979 | 3/1985 | Rogers | 356/28.5 |

*Primary Examiner*—Stephen C. Buczinski
*Attorney, Agent, or Firm*—Darrell G. Brekke; John R. Manning

[57] ABSTRACT

A laser velocimeter (12) has a laser beam generator (18) for generating first and second laser beams (20, 22) having a waist (40) of reduced cross-section area. A first focusing lens (28) has a first focal length F1 for focusing the first and second laser beams (20, 22) so that their waists focused by the lens (28) intersect at a focal point (26) at which a measurement is to be made. A second focusing lens (30) is positioned between the laser beam generator (18) and the first focusing lens (28). The second focusing lens (30) has a second focal length F2. The second focusing lens (30) is positioned from the first focusing lens (28) at a distance corresponding to a sum of the first and the second focal lengths F1 and F2. A third focusing lens (36) having a third focal length F3 is positioned between the laser beam generator (18) and the second lens (30). The third lens (36) is positioned from the second lens (30) a distance corresponding to the sum of the second and third focal lengths F3 and F2. The third focusing lens (36) is positioned in front of the beam waists (40) formed by the laser beam generator (18) a distance corresponding to the third focal length F3. The focusing lenses (28, 30 and 36) coact to focus the laser beams (20, 22) so that their waists intersect at a first focus spot of size W1. The second and third lenses (30, 36) are interchangeable in position by pivoting about a point between them to focus the laser beams (20, 22) so tat their waists intersect at a second focus spot size W2 different than the first focus spot size W1. Photodetector (31) is connected to computer (41), which processes signals derived from scattered light by the photodetector (31) to give measurements of the scattered light.

5 Claims, 4 Drawing Figures

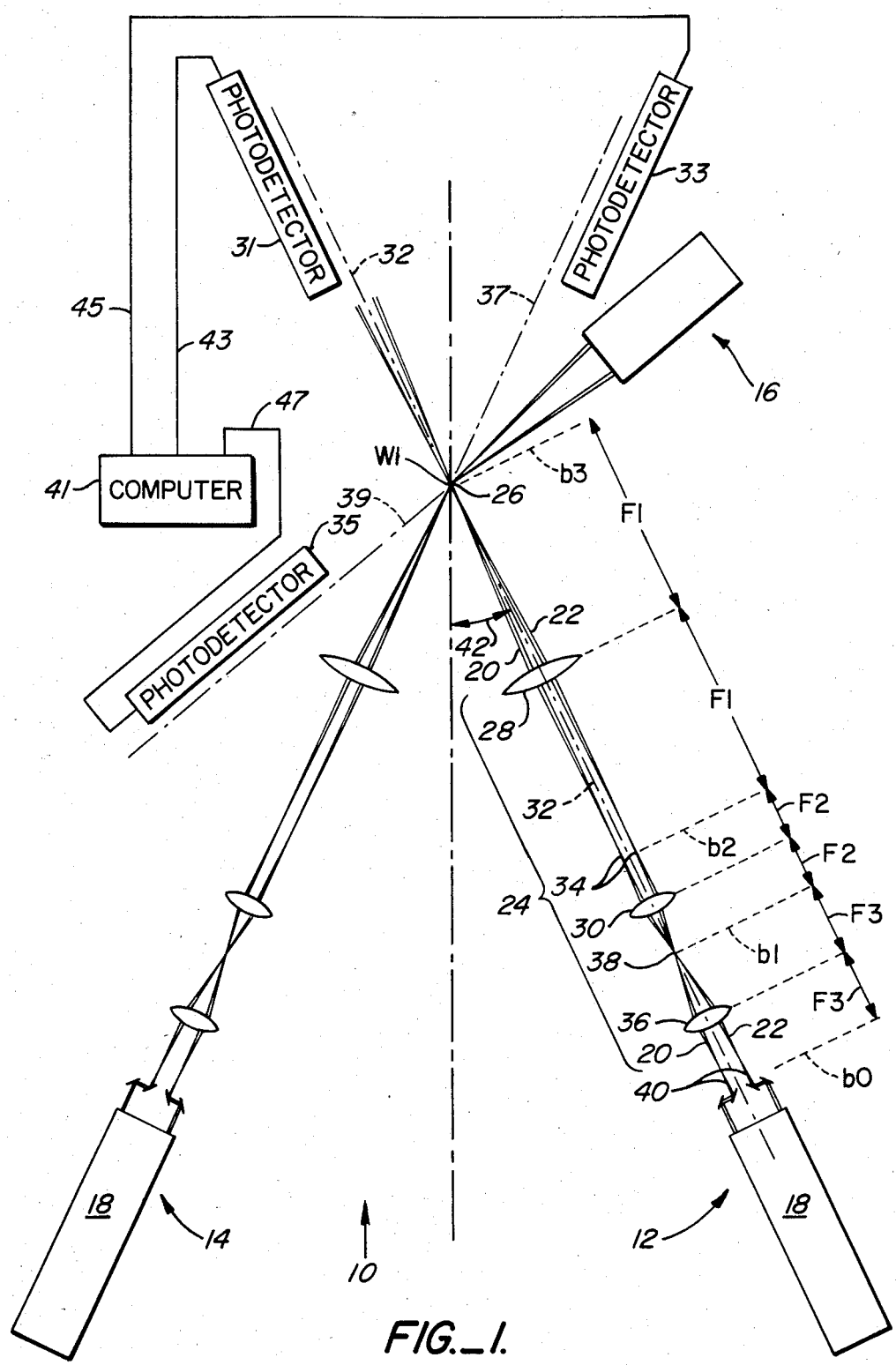
FIG._1.

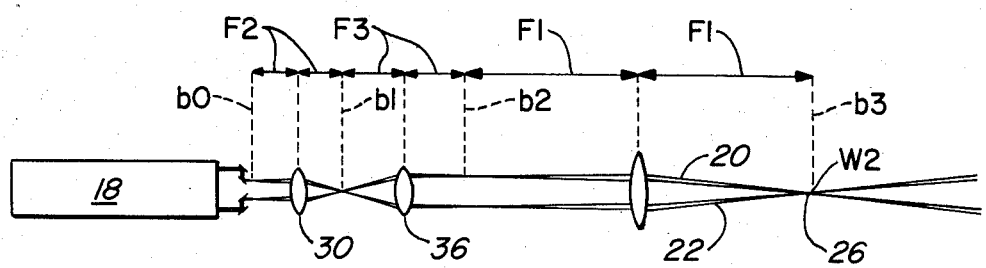
FIG._2.
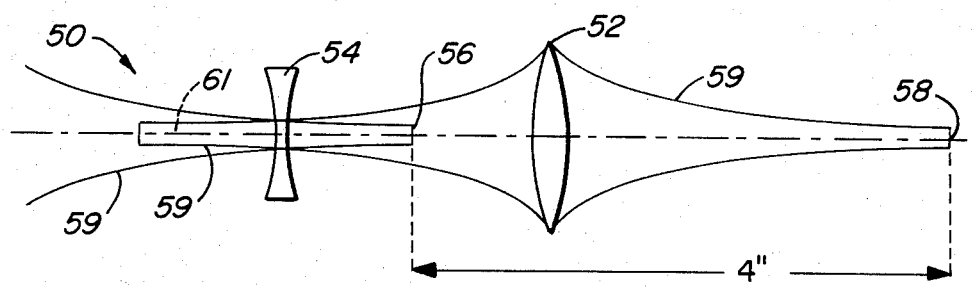
FIG._3.
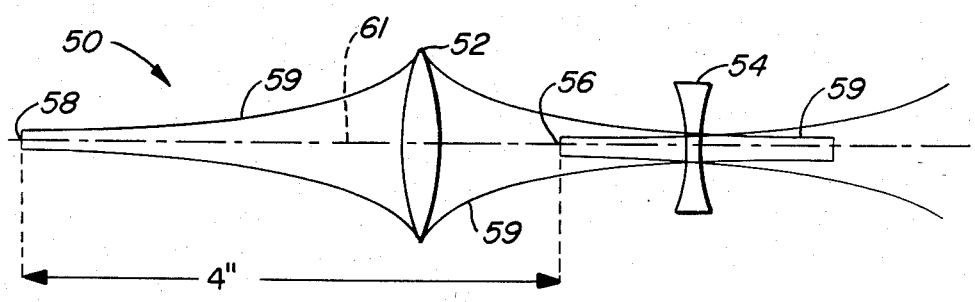
FIG._4.

DUAL MODE LASER VELOCIMETER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to a laser Doppler velocimeter (LDV) that is capable of operating either with a small focus diameter for analysing fluid flows at low velocity with high spatial resolution, or with a larger focus diameter to measure fluid flows at higher velocities accurately. More particularly, it relates to such an LDV in which a simple reversal of a lens pair will allow the LDV to operate in the two focus diameter modes.

2. Description of the Prior Art

LDVs have proven to be very valuable tools for measuring velocity characteristics of moving fluids, particularly for measuring air flow around air foils and similar structures in wind tunnels. The basic principle of operation is that coherent laser light scattered from particulate matter in a fluid moving with a particular velocity will be Doppler shifted by an amount determined by the laser wavelength and the index of refraction of the scattering medium. In the operation of an LDV, a plurality of laser beams are focused so that they have intersecting beam waists, which define a measurement volume at their intersection. As used herein, the term "waist" refers to the point of optimum fringe resolution along the laser beam. A single system having a pair of intersecting beams will provide one dimensional measurements. Conventional means can be used to collect and process the light scattered from such systems. Two subsystems disposed at an angle to one another and each having a pair of intersecting beams will provide measurements in two dimensions. Three subsystems disposed at different angles and each having a pair of intersecting beams will provide three dimensional measurements. Conventional means can be used to collect and process the light scattered from such systems. LDVs are described, for example, in the following issued U.S. patents: U.S. Pat. Nos. 3,825,346, issued July 23, 1974 to Rizzo; U.S. Pat. No. 3,860,342, issued Jan. 14, 1975 and U.S. Pat. No. 3,915,572, issued Oct. 28, 1975, both to Orloff; U.S. Pat. No. 4,148,585, issued Apr. 10, 1979 to Bargeron et al.; U.S. Pat. No. 4,263,002, issued Apr. 21, 1981 to Sathyakumar; U.S. Pat. No. 4,346,990, issued Aug. 31, 1982 to Rhodes; U.S. Pat. No. 4,470,696, issued Sept. 11, 1984 to Ballard; and U.S. Pat. No. 4,506,979, issued Mar. 26, 1985 to Rogers. The state of the art in LDVs is further indicated in Neti et al., "On-Axis Velocity Component Measurement with Laser Velocimeters", AIAA Journal, 17, No. 9, pp. 1013-1015, Sept. 1979.

While the LDVs described in the above prior art show a variety of optical systems used in LDVs, changing the focus diameter from a smaller to a larger size for measuring fluids flowing at higher velocities requires essentially tearing down the entire optical system and repositioning each of the components, from the last focusing lens up to and including the lasers themselves, in two or three dimensional systems.

In very high speed flows, the diameter of the beam waists in the sensitive volume (i.e., the intersection of the crossed laser beams) cannot be too small or measurement accuracy is lost. The scattering particle passes through a small sensitive volume in too short a time for proper measurement. However, at low speed, there is often a requirement for high spatial resolution, demanding small beam diameters at the sensitive volume. Thus, it would be advantageous to have an LDV system which could be easily changed between smaller and larger diameter beam waists in the sensitive volume.

SUMMARY OF THE INVENTION

Accordingly, it is an object of this invention to provide an LDV which is easily switched between a smaller and larger diameter beam waists in its sensitive volume by a simple switch in position of two optical components.

It is another object of the invention to provide such an LDV which is suitable for measuring both high velocity fluid flows accurately and low velocity fluid flows with high spatial resolution.

It is a further object of the invention to provide such an LDV in which the overall length of the LDV system remains constant in either mode of operation, allowing their intersecting beams to meet at the same point in either mode.

The attainment of these and related objects may be achieved through use of the novel LDV herein disclosed. A laser velocimeter in accordance with this invention includes means for generating first and second laser beams having a waist of reduced cross-section area. A first focusing lens has a first focal length for focusing the first and second laser beams so that their waists intersect at a focal point at which a measurement is to be made. A second focusing lens is positioned between the laser beam generating means and the first focusing lens. The second focusing lens has a second focal length. The second focusing lens is spaced from the first focusing lens a distance corresponding to the sum of the first and the second focal lengths. A third focusing lens having a third focal length is spaced between the laser beam generating means and the second focusing lens. The third focusing lens is positioned from the second focusing lens a distance corresponding to the sum of the second and third focal lengths. The third focusing lens is positioned in front of the beam waists generated by the laser beam generating means a distance corresponding to the third focal length. The first, second and third focusing lenses coact when so positioned to focus the first and second laser beams so that their waists focused by the first focusing lens intersect at a first focus spot size. The second and third lenses are interchangeable in position by pivoting about a point between an input beam waist and an output beam waist of a telescope formed by the second and third lenses to focus the first and second laser beams so that their waists focused by the first focusing lens intersect at a second focus spot having a different size than the first focus spot, but at the same location. Conventional means are then used to collect light scattered in the laser velocimeter and process signals derived from the scattered light to reduce the signals to velocity components of the scattered light.

The velocimeter so described may be employed for measurements in one dimension. For obtaining measurements in two dimensions, in a preferred form of an LDV in accordance with the invention, two beams of a different wavelength or polarization can be sent through the same lenses as the first two beams. The plane of the latter two beams intersects the optical axis of the LDV, as does the plane of the first two beams.

These two planes, however, are at an angle to each other, usually 90°. Each pair of beams then measures a different component of velocity. Both components are in the plane perpendicular to the axis of this LDV system. The most straightforward way to provide measurement of a third component, not in that plane, is to add a second LDV subsystem at an angle to the first and so positioned that its two beams cross at the same spot as the other pairs of beams cross.

An alternative would be to have three separate subsystems, each with only two beams, and with all the beams crossing at a common point.

When it is desired to change between a smaller and a larger beam waist diameter in the above described system, the second and third focusing lenses of each laser velocimeter need only be pivoted to exchange the relative positions of the two lenses. Doing so does not change the focal point of the laser velocimeters in the system. As a result, the system can easily be switched between a low fluid flow velocity measurement mode and a high fluid flow velocity measurement mode.

The attainment of the foregoing and related objects, advantages and features of the invention should be more readily apparent to those skilled in the art after review of the following more detailed description of the invention, taken together with the drawings, in which:

BRIEF DESCRIPTION OF THE DRAWINGS

FIG. 1 is a schematic representation of an LDV system in accordance with the invention.

FIG. 2 is a schematic representation of a portion of the system shown in FIG. 1, with certain components positioned for a second mode of operation.

FIG. 3 is a schematic representation of a portion of another embodiment of an LDV in accordance with the invention.

FIG. 4 is another schematic representation of the LDV portion shown in FIG. 3, with components reversed for a second mode of operation.

DETAILED DESCRIPTION OF THE INVENTION

Turning now to the drawings, more particularly to FIGS. 1 and 2, there is shown an LDV system 10 in accordance with the invention. The system 10 comprises three LDV subsystems 12, 14 and 16, with the subsystems 12 and 14 being shown in schematic form and the subsystem 16 indicated in block diagram form. The LDV system 12 includes a beam generator 18 which generates and projects a pair of laser beams 20 and 22, initially parallel to one another. The generator may, for example, simply comprise a laser and an optical beam splitter, and a Bragg cell to shift the frequency of the radiation. The laser beams 20 and 22 are projected through an optics system 24, so that the beams 20 and 22 intersect at a focal point 26, with a beam waist diameter W1. A first focusing lens 28 provides the final focusing of the beams 20 and 22 to intersect one focal length F1 in front of the first focusing lens 28. In the specific form shown in FIG. 1, the focal length F1 is 24 inches. A second focusing lens 30 is provided on the optical axis 32, which second focusing lens 30 supplies the laser beams 20 and 22 to the first focusing lens 28. The second focusing lens 30 generates beam waists 34 in the laser beams 20 and 22 to one focal length F2 of the lens 30 in front of the lens 30. In the specific form shown, the focal length F2 is 7.5 inches. As shown, the first focusing lens 28 is located its focal length F1 in front of the beam waists 34. A third focusing lens 36 directs the laser beams 20 and 22 to the second focusing lens 30 and focuses the laser beams 20 and 22 to form waists 38 one focal length F3 in front of the focusing lens 36. In the specific form shown, the focal length F3 is 9.8 inches. The third focusing lens 36 is placed focal length F3 in front of beam waists 40 formed in the laser beams 20 and 22 by the beam generator 18. The LDV subsystems 14 and 16 are configured in the same manner as the subsystem 12, and therefore will not be explained in detail. In FIG. 1, angle 42 is 40 degrees, and the third subsystem 16 has its velocity measuring axis corresponding to b3 normal to the plane of the paper. In fact 16 could be positioned with its axis coincident with 12 or 14, but rotated 90° about that optical axis so that one beam is above the plane of the drawing and the other is below it. That allows 16 to share the lenses of one of the other systems while measuring the velocity component perpendicular to the plane of the drawing. In the configuration of FIG. 1, the intersecting beam waists at point 26 having diameter W1 are suitable for measuring relatively low velocity fluid flows. When the focusing lenses 28, 30 and 36 comprising the optical system 24 have the focal length distance relationships explained above, the lenses 30 and 36 can be interchanged, as shown in FIG. 2 to give intersecting laser beams 20 and 22 with a larger beam waist diameter W2 at focal point 26, for measuring higher velocity fluid flows. A conventional photodetection system for collection of scattered light and processing of the signals derived from the scattered light includes photodetectors 31, 33 and 35, positioned slightly off the axis 32 of the subsystem 12 and the corresponding axes 37 and 39 of the subsystems 14 and 16, respectively. The photodetectors 31, 33 and 35 are connected to computer 41 by means of lines 43, 45 and 47. Computer 41 is programmed to process the signals derived from the scattered light by the photodetectors 31, 33 and 35 to reduce the signals to measurements of velocity components of the scattered light. In the positions shown, the photodetectors 31, 33 and 35 collect forward scattered light, but they could also be positioned to collect back scattered light, if desired.

The following is a more detailed discussion of the basis on which this mode switching operates. When dealing with narrow laser beams, the theory of geometric optics is inadequate, and diffraction optics theory must be used. Using geometric optics theory we know that if an object is placed at twice the focal length in front of a positive lens, the image will be twice the focal length beyond the lens on the other side. So the smallest diameter part of the light bundles ("focus" at object and image) might each be two focal lengths from the lens on opposite sides of it. In diffraction optics, if a waist (narrowest diameter) of a coherent, Gaussian light beam is one focal length before a positive lens, the lens will form a second beam waist one focal length beyond the lens.

By modifying the design of a conventional one focusing lens laser velocimeter to add the additional focusing lenses 30 and 36 with the distance relationships explained above, the distance between any two adjacent lenses is the sum of their focal lengths.

Referring to FIG. 1, if lens 36 is placed at its focal length beyond waists 40 formed in the beams by the beam generator 18, then throughout the rest of the optical system, beam waists will be formed at every location distant from a lens by the focal length of the lens. This includes the sensitive measurement volume formed by the crossing of the laser beams 20 and 22 at 26.

Since the sum of the focal lengths of lenses 30 and 36 is the same, whichever is taken first, we can reverse the positions of the lenses 30 and 36, readjusting so that each lens 30 and 36 is its own focal length from the adjacent beam waists. The total length from the beam generator 18 to the system focal point 26 will be the same. This allows the separate angled subsystems 12, 14 and 16 to still cross at the same point 26, where the beam waist and single component crossings are, without having to move all the components used for forming the beams. The purpose of this interchange of lenses 30 and 36 is to change the size of the beam waists at the focal point 26, and to change the angles between each pair of beams in the individual subsystems 12, 14 and 16.

The general equation for the location of a second beam waist is a complicated function of the wavelength of light, the focal length of the lens, the diameter of the first waist (40 in FIG. 1) and the location of the first waist. If the first waist is one focal length from the lens 36 in FIG. 1, everything simplifies and the second waist 38 is also one focal length from the lens 36.

The confocal parameter $b = 2\pi W_o^2/\lambda$ where $W_o$ is the radius of the Gaussian beam waist. When the waists are at one focal length from the lens the formidable formula for the size of the second beam waist also simplifies and we have $b_2 = 4F^2/b_1$ where $F$ is the focal length of the lens.

Starting at the location of the beam waists $b_o$ in FIG. 1, we have:

$$b_1 = 4F_3^2/b_o$$

$$b_2 = 4F_2^2/b_1$$
$$= 4F_2^2(b_o/4F_3^2)$$
$$= (F_2/F_3)^2 b_o$$

$$b_3 = 4F_1^2/b_2$$
$$= \frac{4F_1^2}{(F_2/F_3)^2 b_o}$$
$$= \frac{4F_1^2 F_3^2}{F_2^2 b_o}$$

If lenses 2 and 3 are reversed, we have:

$$b_1' = 4F_2^2/b_o$$

$$b_2' = 4F_3^2/b_1'$$
$$= 4F_3^2(b_o/4F_2^2)$$
$$= (F_3/F_2)^2 b_o$$

$$b_3' = 4F_1^2/b_2'$$
$$= \frac{4F_1^2}{(F_3/F_2)^2 b_o}$$
$$= \frac{4F_1^2 F_2^2}{F_3^2 b_o}$$

$$b_3'/b_3 = (F_2/F_3)^4 \rightarrow W_o'/W_o = (F_2/F_3)^2$$

This show that by switching the location of lenses 30 and 36 we can change the diameter of the beam waists at the sensitive volume by the square of the ratio of the focal lengths of lenses 30 and 36.

If the beams are parallel and spaced apart a distance $S_o$ as they leave the beam forming components, then after traversing lenses 30 and 36 they will be parallel and spaced apart by a distance $S$.

$$S = (F_2/F_3)S_o$$

If we reverse these two lenses, the beams will go through lens 30 and then lens 36 and they will again be parallel after the two lenses, but with a spacing $S'$.

$$S' = (F_3/F_2)S_o S'/S = (F_3/F_2)^2$$

To illustrate, assume $F_3$ is 1.5 times more than $F_2$. Then $$S' = (1.5)^2 S = 2.25 S$$

The spacing of the beams is greater in the primed case, resulting in a closer fringe spacing by a factor of 2.25.

Similarly $$W_o'/W_o = (F_2/F_3)^2 = (1/1.5)^2 = 1/2.25 = 0.44$$

So in the primed case, suitable for low speeds, the size of the sensitive volume and the fringe spacing are approximately 0.44 of the values in the other, unprimed case (which is appropriate for high velocities).

In order to assure that the beam waists ($b_o$ in FIG. 2) that remain constant are of the right diameter and at the right location, each leg or subsystem must have inserted somewhere between $b_o$ and the laser, a means of adjusting both the diameter and convergence of the laser beam. One such means is the beam generator 18, described above.

For example, consider the situation where the converging lenses have a 150 mm focal length and the diverging lenses might have a 50 mm focal length. When the space between the converging lenses is 200 mm, and the space between each diverging lens and its adjacent converging lens is 100 mm, then the device is set for one to one magnification and parallel output.

Individual focus adjustments on either both converging lenses, both diverging lenses, or a diverging lens from one end of the device and a converging lens from the other will provide the necessary two degrees of freedom to set the size and location of the beam waists, $b_o$.

If some other ratios of parameters were desired, any pair of lenses whose focal lengths were equal to $F_2 + F_3$ could be substituted without changing the length of the subsystems. A different pair of lenses not exactly meeting this criterion could also be used if an adjustment were made in the beam forming components, re-focussing so that the new location of the beam waists, $b_o$, was at the right position to allow for the new focal length total. Now switching these two lenses would result in going between two new modes.

The above description is in terms of a system 10 incorporating positive focal length lenses. FIGS. 3 and 4 show a portion of an LDV subsystem 50 in which the lenses 30 and 36 in the subsystem 12 of FIG. 1 have been replaced by a positive focal length lens 52 and a negative focal length lens 54. For clarity in explaining the longitudinal location of beam waists 56 and 58, only a single beam 59 is shown, on optical center line 61. In the real telescope, as in the telescope with two positive lenses, outside the space between the lenses, the two beams are parallel to each other and to the optical axis 61 of the telescope. The distances between the beams at the two ends of the telescope are in the ratio of the absolute value of the focal lengths of the two lenses 52 and 54. In a complete three dimensional LDV system, corresponding substitutions would be made for the other second and third focusing lenses in the subsystems 14 and 16 of FIG. 1 as well. Positive focal length lens 52 has a 3 inch focal length, and negative focal length lens 54 has a focal length of 1 inch. The same relationships between the positioning of the lenses 52 and 54 apply as for the lenses 30 and 36 in FIG. 1. The distance between beam waist 56, in this case a virtual waist generated by the beam forming apparatus 18, and the beam waist 58 generated by the lens 52 remains the algebraic sum of twice the focal lengths of the two lenses $(2\times3$ inches$)+(2\times(-1))$ inches$=4$ inches. In FIG. 2 this would correspond to the distance from $b_o$ to $b_2$, input to output waists of the telescope, $=2F_2+2F_3$. As with lenses 30 and 36, the distance between the lenses 52 and 54 is the algebraic sum of their focal lengths (in this case $3+(-1)=2$ inches corresponding to $F_2+F_3$ in FIG. 2. In FIG. 4, the lenses 52 and 54 have their relative positions reversed, in the same manner as the reversal of the lenses 30 and 36 in FIG. 2. Other than as shown and described, the construction and operation of the LDV subsystem 50 of FIGS. 3 and 4 and a complete three dimensional LDV system incorporating three of the subsystems 50 is the same as for the FIGS. 1 and 2 embodiment of the invention.

It should now be readily apparent to those skilled in the art that a novel LDV system capable of achieving the stated objects of the invention has been provided. The LDV of this invention is easily switched between operating modes providing a smaller and larger diameter beam waists in its sensitive volume by a simple switch in position of two lenses. The LDV of this invention is therefore suitable for measuring both high velocity fluid flows accurately and low velocity fluid flows with high spatial resolution. The overall length of the LDV system remains constant in either mode.

It should further be apparent to those skilled in the art that various changes in form and details of the invention as shown and described may be made. It is intended that such changes be included within the spirit and scope of the claims appended hereto.

What is claimed is:

1. A laser velocimeter, which comprises means for generating first and second laser beams having a waist of reduced cross section area, a first focusing lens having a first focal length for focusing the first and second laser beams so that their waists intersect at a focal point at which a measurement is to be made, a second focusing lens positioned between said laser beam generating means and said first focusing lens, said second focusing lens having a second focal length, said second focusing lens being positioned between said laser beam generating means and said first focusing lens at a distance corresponding to an algebraic sum of the first and the second focal length from said first focusing lens, a third focusing lens having a third focal length positioned between said laser beam generating means and said second focusing lens, said third focusing lens being positoned from said second focusing lens a distance corresponding to an algebraic sum of the second and third focal lengths, said third focusing lens being positioned in front of the beam waists generated by said laser beam generating means a distance corresponding to the third focal length, said first, second and third focusing lenses coacting when so positioned to focus the first and second laser beams so that their waists focused by said first focusing lens intersect at a first focus spot size, said second and third lenses being interchangeable in relative position in said velocimeter with adjustment of location of said second and third lenses when interchanged so that each of said second and third lenses is its own focal length from adjacent beam waists generated by said laser beam generating means and output beam waists generated by said second and third lenses, to focus the first and second laser beams so that their waists focused by said first focusing lens intersect at a second focus spot size different than the first focus spot size, means to collect light scattered in said laser velocimeter to produce signals derived from the scattered light, and means for processing the signals to reduce the signals to velocity components of the scattered light.

2. The laser velocimeter of claim 1 in which said first, second and third focusing lenses have positive focal lengths, and the pivoting point is between said second and third lenses.

3. A two-dimensional laser velocimeter comprising first and second laser velocimeters in accordance with claim 1 positioned with a focal axis of each of said first and second laser velocimeters at an angle to each other, said first and second laser velocimeters focusing each of their first and second laser beams at a common focal point.

4. A three-dimensional laser velocimeter comprising first, second and third laser velocimeters in accordance with claim 1 positioned with a focal axis of each of said first, second and third laser velocimeters at an angle to each other, said first, second and third laser velocimeters focusing each of their first and second laser beams at a common focal point.

5. A laser velocimeter in accordance with claim 1 in which said first and second focusing lenses have positive focal lengths and said third focusing lens has a negative focal length.

* * * * *